(12) United States Patent
Zhang et al.

(10) Patent No.: US 12,379,289 B2
(45) Date of Patent: Aug. 5, 2025

(54) MULTI-SCALE AND MULTI-PARAMETER COLLABORATIVE TESTING DEVICE AND METHOD FOR TRUE TRIAXIAL HYDRAULIC FRACTURING

(71) Applicant: Anhui University of Science and Technology, Anhui (CN)

(72) Inventors: Pingsong Zhang, Anhui (CN); Chang Liu, Anhui (CN); Yuanchao Ou, Anhui (CN)

(73) Assignee: ANHUI UNIVERSITY OF SCIENCE AND TECHNOLOGY, Huainan (CN)

( * ) Notice: Subject to any disclaimer, the term of this patent is extended or adjusted under 35 U.S.C. 154(b) by 0 days.

(21) Appl. No.: 18/029,988

(22) PCT Filed: Dec. 15, 2022

(86) PCT No.: PCT/CN2022/139257
§ 371 (c)(1),
(2) Date: Apr. 3, 2023

(87) PCT Pub. No.: WO2024/098509
PCT Pub. Date: May 16, 2024

(65) Prior Publication Data
US 2025/0085196 A1    Mar. 13, 2025

(30) Foreign Application Priority Data
Nov. 8, 2022 (CN) .......................... 202211392342.3

(51) Int. Cl.
*G01M 99/00* (2011.01)
*G01N 23/046* (2018.01)

(52) U.S. Cl.
CPC ........ *G01M 99/008* (2013.01); *G01M 99/005* (2013.01); *G01N 23/046* (2013.01); *G01N 2223/31* (2013.01); *G01N 2223/311* (2013.01)

(58) Field of Classification Search
CPC . G01M 99/005; G01M 99/008; G01N 23/046
See application file for complete search history.

(56) References Cited

U.S. PATENT DOCUMENTS 10,139,355 B1 * 11/2018 Li .................. G01N 23/046
11,692,952 B1 * 7/2023 Li ...................... G01N 3/08
378/4

(Continued)

*Primary Examiner* — Eric S. McCall (57) ABSTRACT

Provided are a multi-scale and multi-parameter collaborative testing device and method for true triaxial hydraulic fracturing. The method includes: processing a retrieved rock sample, forming a fracturing port on the top surface of a rock specimen, placing a fracturing pipe in a hole, and connecting the fracturing pipe to a high-pressure water supply pipe; installing and connecting sensors on pressure plates, connecting wires, and turning on testing devices; sealing an airtight chamber, filling oil into the airtight chamber until the airtight chamber is full of oil, and keeping a room temperature constant; turning on a water supply device, starting hydraulic fracturing, and turning on testing modules at the same time; and stopping hydraulic fracturing after complete fracture of the specimen, returning oil to an oil tank, opening the airtight chamber to take out the specimen for observation and photographing, and performing data processing and analysis at the same time.

16 Claims, 4 Drawing Sheets

(56) References Cited

U.S. PATENT DOCUMENTS

| | | | | |
|---|---|---|---|---|
| 12,123,852 B1* | 10/2024 | Hu | ............... | G01N 33/24 |
| 2017/0003263 A1* | 1/2017 | Huang | ............... | G01N 33/24 |
| 2018/0340417 A1* | 11/2018 | Cooper | ............... | E21B 49/02 |
| 2018/0340873 A1* | 11/2018 | Zhang | ............... | G01N 3/00 |
| 2023/0044928 A1* | 2/2023 | Harris | ............... | E21B 43/2607 |
| 2025/0085196 A1* | 3/2025 | Zhang | ............... | G01M 99/008 |

* cited by examiner

MULTI-SCALE AND MULTI-PARAMETER COLLABORATIVE TESTING DEVICE AND METHOD FOR TRUE TRIAXIAL HYDRAULIC FRACTURING

CROSS-REFERENCE TO RELATED APPLICATION

This patent application is a National Stage entry of Patent Cooperation Treaty Application No. PCT/CN2022/139257 filed Dec. 15, 2022, which claims the benefit and priority of Chinese Patent Application No. 202211392342.3 filed Nov. 8, 2022, the disclosures of which are incorporated by reference herein in their entirety as part of the present application.

TECHNICAL FIELD

The present disclosure relates to physical simulation experimental study of hydraulic fracturing, and in particular to a multi-scale and multi-parameter collaborative testing device and method for true triaxial hydraulic fracturing.

BACKGROUND

As the main primary energy in China, coal resource accounts for a large proportion of energy, and China will still maintain a coal-based energy structure for a considerable period of time to come. With years of coal mining in China, the shallow coal reserves have faced the exhaustion, and the mining direction has gradually extended to the depth. The geological environment at depth, different from that at shallow, is complex in conditions, especially the characteristics of "high confining pressure, high temperature, high stress, strong aging and strong disturbance", which makes the mechanism of rock fracturing under the action of deep water pressure unclear, and the study on the mechanism of hydraulic fracturing under the true triaxial action still needs to be vigorously carried out.

Similar simulation test of crack development and propagation in hydraulic fracturing of rock mass in coal strata is an important study tool to study water burst models of wall rocks, efficient utilization of gas and grouting reinforcement of fractured rock mass.

Rock fracturing is often the generation and accumulation of micro cracks, gradually forming local cracks, micro pores. Under the combined action of internal and external forces, the local cracks and pores propagate and extend to form cracks and holes in the rock mass, which in turn affect the mechanical properties of rock mass macroscopically, resulting in rock mass deformation events such as damage and instability. In the prior art, generally combining with a detection method, the structural change of a rock specimen is detected by using some technical means from the scale of the rock specimen, the initiation and propagation process of cracks in the rock specimen is sensed through obtained physical parameters, and a formation state of the hydraulic fracturing-induced rock cracks is finally obtained through continuous monitoring, thus evaluating the hydraulic fracturing effect. However, the traditional evaluation method usually employs a single testing means or method, which cannot achieve multi-scale and multi-parameter collaborative testing. Therefore, it is essential to design a multi-scale and multi-parameter collaborative testing device and method for true triaxial hydraulic fracturing.

SUMMARY

An objective of the present disclosure is to provide a multi-scale and multi-parameter collaborative testing device and method for true triaxial hydraulic fracturing, which have the functions of environment loading, mesoscopic and macroscopic combination and multi-geological physical field collaboration, can provide an operation method and a data processing method at the same time, and thus play an important role in obtaining the mechanism of hydraulic fracturing of deep rock masses, monitoring the dynamic development of rock cracks and characterizing parameters of the degree of crack development.

To achieve the objective above, the present disclosure provides the following solutions:

A multi-scale and multi-parameter collaborative testing device for true triaxial hydraulic fracturing includes a frame, a true triaxial chamber, a clamping and loading device, a water supply device, an oil supply device, a CT scanning module, an electrical testing module, an acoustic emission testing module, a strain testing module, a magnetic testing module, a computer, and a display screen. The clamping and loading device is fixed into the frame, and the true triaxial chamber is placed in the clamping and loading device. The clamping and loading device penetrates through the true triaxle chamber and then is connected to a rock specimen. The oil supply device is connected to the true triaxial chamber, and is configured to supply oil into the true triaxial chamber. The water supply device penetrates through the clamping and loading device and then is connected to the rock specimen, and is configured to provide high-pressure water for the rock specimen. The electrical testing module, the acoustic emission testing module, the strain testing module and the magnetic testing module are respectively fixed to the clamping and loading device and are connected to the rock specimen. The CT scanning module is located on the front side and the rear side of the true triaxial chamber. The CT scanning module, the electrical testing module, the acoustic emission testing module, the strain testing module and the magnetic testing module are connected to the computer. The computer is electrically connected to the display screen.

Alternately, the frame is composed of a top plate, a bottom plate, and four columns. The clamping and loading device is welded to the center positions of the inner sides of the top plate and the bottom plate. The top plate and the bottom plate are connected by the columns and fixed by bolts, and anti-skid pads are fixed to the bottoms of the columns.

The true triaxial chamber includes an airtight chamber, an oil inlet, and an oil outlet. The rock specimen is placed in the airtight chamber, and the airtight chamber is configured to provide a certain confining pressure for the rock specimen. The airtight chamber includes a barrel body and a bottom plate, bolt holes are formed on the periphery of the lower end of the barrel body to link the barrel body to the bottom plate. The center of each face of the airtight chamber is provided with a round hole for the clamping and loading device to pass through. The oil inlet is formed in the upper part of the side face of the airtight chamber, the oil outlet is formed in the bottom face of the airtight chamber, and the oil inlet and the oil outlet respectively communicate with the internal of the airtight chamber.

The CT scanning module is composed of a CT transmission device and a CT receiving device located on the front side and the rear side of the true triaxial chamber and is configured to provide real-time scanning for a specimen. The CT transmission device and the CT receiving device are electrically connected to the computer, respectively.

Alternately, the clamping and loading device includes an upper pressure supply chamber, an upper pressure column, an upper pressure plate, a lower pressure supply chamber, a lower pressure column, a lower pressure plate, a left side pressure supply chamber, a left pressure column, a left pressure plate, a right side pressure supply chamber, a right pressure column, a right pressure plate, a front pressure supply chamber, a front pressure column, a front pressure plate, a rear pressure supply chamber, a rear pressure column, and a rear pressure plate. The upper pressure supply chamber and the lower pressure chamber are respectively welded to the center positions of the inner sides of the top plate and the bottom plate. The upper pressure column, the lower pressure column, the left pressure column, the right pressure column, the front pressure column and the rear pressure column are respectively connected to the upper pressure supply chamber, the lower pressure supply chamber, the left side pressure supply chamber, the right side pressure supply chamber, the front pressure supply chamber and the rear pressure supply chamber. The upper pressure plate, the lower pressure plate, the left pressure plate, the right pressure plate, the front pressure plate and the rear pressure plate are connected to the front parts of the upper pressure column, the lower pressure column, the left pressure column, the right pressure column, the front pressure column and the rear pressure column. The pressure plates in all directions are configured to commonly press the rock specimen, thus providing the rock specimen with axial pressure and lateral pressure for the required experimental conditions.

A round hole is formed in the upper pressure plate to provide an inlet for the water supply device. The electrical testing module, the strain testing module and the magnetic testing module are fixed to each of the upper pressure plate, the lower pressure plate, the left pressure plate and the right pressure plate. The acoustic emission modules are fixed to the left pressure plate and the right pressure plate.

Alternately, the water supply device is formed by connecting an air compressor, a high-pressure gas pipe, an airtight water trough and a high-pressure water supply pipe in sequence. The fracturing pipe is located in a fracturing hole on the end face of the rock specimen. The high-pressure water supply pipe enters the airtight chamber from the upper pressure supply chamber via the upper pressure column, and then enters the fracturing pipe from a hole on the upper pressure plate to provide high-pressure water for the rock specimen.

The oil supply device includes an oil tank, an oil inlet pipeline and an oil outlet pipeline. The oil inlet pipeline is connected to the oil tank, and the oil inlet pipeline is connected to the oil inlet. The oil outlet pipeline is connected to the oil outlet, and the oil outlet pipeline is connected to the oil tank and is configured to supply oil into the airtight chamber.

Alternately, the electrical testing module includes copper rod electrodes, high-strength piezoelectric ceramic sheaths, a module black box of a parallel electrical instrument, and a host of the parallel electrical instrument. The copper rod electrodes are respectively embedded into the upper pressure plate, the lower pressure plate, the left pressure plate and the right pressure plate. The electrodes in the left pressure plate and the right pressure plate are in a "cross" shape, two orthogonal survey lines are provided with six equally spaced electrodes, and an electrode B and an electrode N are additionally provided. The electrodes in the upper pressure plate and the lower pressure plate are in a shape of the "Union Jack", a horizontal survey line and a vertical survey line each are provided with six equally spaced electrodes, two inclined survey lines each are provided with eight equally spaced electrodes, and an electrode B and an electrode N are additionally provided. The high-strength piezoelectric ceramic sheaths are sleeved outside the copper rod electrodes, the copper rod electrodes are connected to the module black box of the parallel electrical instrument, the module black box of the parallel electrical instrument is electrically connected to the host of the parallel electrical instrument, and the host of the parallel electrical instrument is electrically connected to the computer.

Alternately, the acoustic emission testing module includes acoustic emission probes, high-strength piezoelectric ceramic sheaths, and an acoustic emission instrument. The acoustic emission probes are embedded into the left pressure plate and the right pressure plate, and four acoustic emission probes are rectangularly distributed on each pressure plate. The high-strength piezoelectric ceramic sheaths are sleeved outside the acoustic emission probes, the acoustic emission probes are electrically connected to the acoustic emission instrument, and the acoustic emission instrument is electrically connected to the computer.

Alternately, the strain testing module includes strain units, and a strain gauge. The strain units are embedded into the upper pressure plate, the lower pressure plate, the left pressure plate and the right pressure plate, and each pressure plate includes four strain units. The strain units are electrically connected to the strain gauge, and the strain gauge is electrically connected to the computer.

Alternately, the magnetic testing module includes multi-turn magnetic coil, and a magnetic susceptibility meter. The multi-turn magnetic coil is located in the upper pressure plate, the lower pressure plate, the left pressure plate and the right pressure plate, the coil is made of metallic copper, and the number of coil turns in each pressure plate is $n\varepsilon[10,30]$. The multi-turn magnetic coil is electrically connected to the magnetic susceptibility meter, and the magnetic susceptibility meter is electrically connected to the computer.

A multi-scale and multi-parameter collaborative testing method for true triaxial hydraulic fracturing includes the following steps:
step 1: processing a retrieved rock sample, cutting the rock sample into a square block with a side length of 100 mm, forming a fracturing port with a diameter of 10 mm and a depth of 20 mm on the top face of a rock specimen, placing a fracturing pipe in the hole, and connecting the fracturing pipe to a high-pressure water supply pipe;
step 2: installing and connecting sensors on pressure plates, connecting wires, and turning on testing devices;
step 3: sealing an airtight chamber, filling oil into the airtight chamber until the airtight chamber is full of oil, and keeping the room temperature constant;
step 4: turning on a water supply device, starting hydraulic fracturing, and turning on a CT scanning module, an acoustic emission testing module, a strain testing module and a magnetic testing module at the same time; and
step 5: stopping hydraulic fracturing after complete fracture of the specimen, returning oil to an oil tank, opening the airtight chamber to take out the specimen for observation and photographing, and performing data processing and analysis at the same time.

According to specific embodiments provide by the present disclosure, the present disclosure obtains the following technical effects: In accordance with the multi-scale and multi-parameter collaborative testing device and method for true-triaxial hydraulic fracturing, the meso-scale and specimen-scale rock specimen fracture observation in the true triaxial hydraulic fracturing process is achieved. Four fields are provided for collaborative testing by the device, and thus the hydraulic fracturing process of the rock specimen is depicted from the perspectives of electrical parameters, acoustic generation parameters, strain parameters and magnetic parameters. Through the real-time monitoring of parameters, the initiation and propagation of cracks in the rock specimen can be captured, which is of a great significance to the obtaining of the mechanism of hydraulic fracturing of the deep rock specimen. The device has the functions of high-speed acquisition and high-speed storage, can capture the changes of the cracks and instantaneous parameters, and thus plays an important role in obtaining the fracture precursor information of the rock and predicting the crack propagation direction in the rock specimen. The device and method provided by the present disclosure can help to obtain the hydraulic fracturing principle of the deep rock mass, and can help to characterize the initiation and propagation parameters of the cracks under the action of the wall rock water pressure under mining conditions, the characteristics of hydraulic fracturing precursor information of the rock, and the prediction of cracks in the hydraulic fracturing process.

BRIEF DESCRIPTION OF THE DRAWINGS

To describe the technical solutions in the embodiments of the present disclosure or in the prior art more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

In the drawings: 1—frame; 2—rock specimen; 3—fracturing pipe; 4—airtight chamber; 5—oil inlet; 6—oil outlet; 7—upper pressure supply chamber; 8—upper pressure column; 9—upper pressure plate; 10—right side pressure supply chamber; 11—right pressure column; 12—right pressure plate; 13—lower pressure supply chamber; 14—lower pressure column; 15—lower pressure plate; 16—left side pressure supply chamber; 17—left pressure column; 18—left pressure plate; 19—copper rod electrode; 20—high-strength piezoelectric ceramic sheath; 21—wire; 22—acoustic emission probe; 23—transmission line; 24—strain unit; 25—multi-turn magnetic coil; 26—high-pressure water supply pipe; 27—airtight water trough; 28—high-pressure gas pipe; 29—air compressor; 30—oil tank; 31—oil inlet pipeline; 32—oil outlet pipeline; 33—module black box of parallel electrical instrument; 32—host of parallel electrical instrument; 35—acoustic emission instrument; 36—strain gauge; 37—magnetic susceptibility meter; 38—computer; 39—display screen; 40—anti-skid pad; 41—screw; 42—CT transmission device; 43—CT receiving device; 44—front pressure supply chamber; 45—front pressure column; 46—front pressure plate; 47—rear pressure supply chamber; 48—rear pressure column; 49—rear pressure plate.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

An objective of the present disclosure is to provide a multi-scale and multi-parameter collaborative testing device and method for true triaxial hydraulic fracturing. The device is simple in structure, low in computation complexity, capable of operating in a channel environment with frequency selective fading, fast time-varying and time-domain non-stationary characteristics, strong in anti-interference capability, and suitable for a high-speed testing environment.

To make the objectives, features and advantages of the present disclosure more apparently and understandably, the following further describes the present disclosure in detail with reference to the accompanying drawings and the specific embodiments.

The technical principle of the present disclosure is as follows:

1. Monitoring Principle of Parallel Electrical Method

A single-point power field test method is employed, i.e., a common ground electrode N and a negative electrode B of a common current electrode are separately arranged, and n electrodes on a survey line automatically take turns to serve as a current electrode A, and the remaining n−1 electrodes serve as electrodes M. Therefore, current values of n electrodes and potential values of (n−1)×n electrode can be measured through n measuring electrodes. Furthermore, apparent resistivity values of all the electrode distance arrangement combinations in the n electrodes are measured by using a three-pole method.

$$\rho = \frac{2\pi}{\left(\frac{1}{AM} - \frac{1}{AN} - \frac{1}{BM} + \frac{1}{BN}\right)} * \frac{\Delta U}{I} = K\frac{\Delta U}{I} \quad \text{(Formula 1)}$$

In the formula, $\rho$ is apparent resistivity, AM is the distance between the electrode A and the electrode M, AN is the distance between the electrode A and the electrode N, BM is the distance between the electrode B and the electrode M, BN is the distance between the electrode B and the electrode N, and K is a coefficient of the device.

$$K = \frac{2\pi}{\frac{1}{AM} - \frac{1}{AN} - \frac{1}{BM} + \frac{1}{BN}} \quad \text{(Formula 2)}$$

The three-pole method refers to the electrode A, the electrode M and the electrode N. When MN spacing is small, the formula 2 may be simplified as follows:

$$K = \frac{2\pi}{\frac{1}{AM} - \frac{1}{AN}} = \frac{2\pi AM \cdot AN}{MN} \quad \text{(Formula 3)}$$

That is, when MN is much less than AO, (O is the middle point of MN)

$$K = \frac{2\pi \overline{AO}^2}{MN} \quad \text{(Formula 4)}$$

$2\pi \overline{AO}^2$ is the horizontal distance area passing through two equipotential surfaces M and N, and MN is a distance between the equipotential surfaces M and N.

2. Monitoring Principle of Acoustic Emission

When the loaded rock specimen 2 is damaged, elastic wave signals released by the defects inside the rock specimen 2 are propagated to the surface of the specimen, generating weak vibration. These vibration signals are converted into electrical signals by acoustic emission probes 22, and then are amplified, processed and stored in a magnetic disk in the form of parameters or waveforms. The propagation forms of the elastic wave signals in the rock specimen 2 can be divided into longitudinal wave, transverse wave and surface wave.

2.1 Longitudinal Wave

A propagation direction of the longitudinal wave (P wave) is consistent with a vibration direction of a particle, and the expression of wave velocity is as follows:

$$v_p = \sqrt{\frac{E}{\rho} \frac{1-\sigma}{(1+\sigma)(1-2\sigma)}} \quad \text{(Formula 5)}$$

In the formula, $\rho$ is the density of a material, E is the elastic modulus of the material, and $\sigma$ is a Poisson's ratio.

2.2 Transverse Wave

A propagation direction of the transverse wave (S wave) is perpendicular to a vibration direction of a particle, and the expression of wave velocity is as follows:

$$v_s = \sqrt{\frac{E}{\rho} \frac{1-\sigma}{2(1+\sigma)}} = \sqrt{\frac{G}{\rho}} \quad \text{(Formula 6)}$$

In the formula, G is the shear modulus of the material.

2.3 Acoustic Emission Attenuation

After the elastic wave propagates in a medium for a certain distance, the signal strength decreases, and the waveform amplitude of such an attenuation type has an exponential relationship with the propagation distance.

$$p(x) = p_0 e^{-\delta x} \quad \text{(Formula 7)}$$

In the formula, p(x) is an amplitude of the acoustic wave, x is the propagation distance of the acoustic wave, $\delta$ is an attenuation coefficient, and $p_0$ is the amplitude of the acoustic wave at an acoustic emission source.

3. Monitoring Principle of Strain

The natural vibration frequency of a steel string varies with the tension (stress) of the steel string; and the change of the pressure on a pressure box membrane can be known by measuring the frequency change of the steel string.

4. Monitoring Principle of Magnetic Method

The rock specimen 2 in the hydraulic fracturing process produces magnetic change, and the magnetic parameter characterization of the rock specimen 2 in the hydraulic fracturing process can be achieved by monitoring this magnetic change.

As shown in FIG. 1 to FIG. 5, a multi-scale and multi-parameter collaborative testing device for true triaxial hydraulic fracturing provided by an embodiment of the present disclosure includes a frame 1, a true triaxial chamber, a clamping and loading device, a water supply device, an oil supply device, a CT scanning module, an electrical testing module, an acoustic emission testing module, a strain testing module, a magnetic testing module, a computer 38, and a display screen 39. The clamping and loading device is fixed into the frame 1, and the true triaxial chamber is placed in the clamping and loading device. The clamping and loading device penetrates through the true triaxle chamber and then is connected to a rock specimen 2. The oil supply device is connected to the true triaxial chamber and configured to supply oil into the true triaxial chamber. The water supply device penetrates through the clamping and loading device and then is connected to the rock specimen 2, and is configured to provide high-pressure water for the rock specimen 2. The electrical testing module, the acoustic emission testing module, the strain testing module and the magnetic testing module are respectively fixed to the clamping and loading device and are connected to the rock specimen 2. The CT scanning module is located on the front side and the rear side of the true triaxial chamber. The CT scanning module, the electrical testing module, the acoustic emission testing module, the strain testing module and the magnetic testing module are connected to the computer 38; and the display screen 39 is electrically connected to the computer 38. Accessories in a testing region of the rock specimen 2 are all made of a carbon fiber material, and the rest is made of a steel material.

Figure 1:
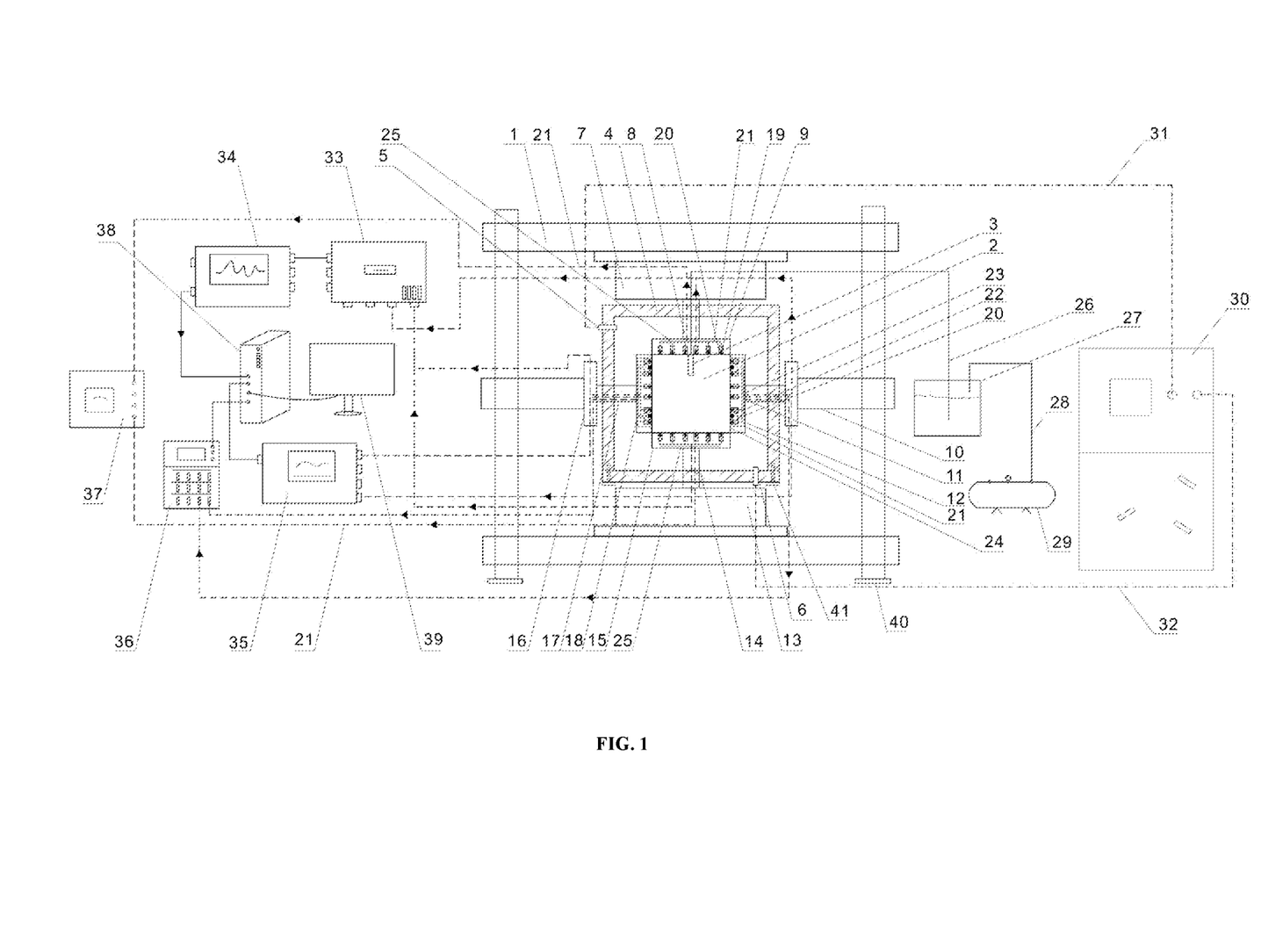
FIG. 1 is a front view of a device structure in accordance with the present disclosure.

The frame 1 is composed of a top plate, a bottom plate and four columns. The clamping and loading device is welded to the center positions of the inner sides of the top plate and the bottom plate. The top plate and the bottom plate are connected by the columns and fixed by bolts, and anti-skid pads 40 are fixed to the bottoms of the columns.

The true triaxial chamber includes an airtight chamber 4, an oil inlet 5, and an oil outlet 6. The rock specimen 2 is placed in the airtight chamber 4, and the airtight chamber 4 is configured to provide a certain confining pressure for the rock specimen 2. The airtight chamber 4 includes a barrel body and a bottom plate, bolt holes are formed on the periphery of the lower end of the barrel body to link the barrel body to the bottom plate. The center of each face of the airtight chamber 4 is provided with a round hole for the clamping and loading device to pass through. The oil inlet 5 is formed in the upper part of the side face of the airtight chamber 4, the oil outlet 6 is formed in the bottom face of the airtight chamber 4, and the oil inlet 5 and the oil outlet 6 respectively communicate with the internal of the airtight chamber 4.

Figure 3:
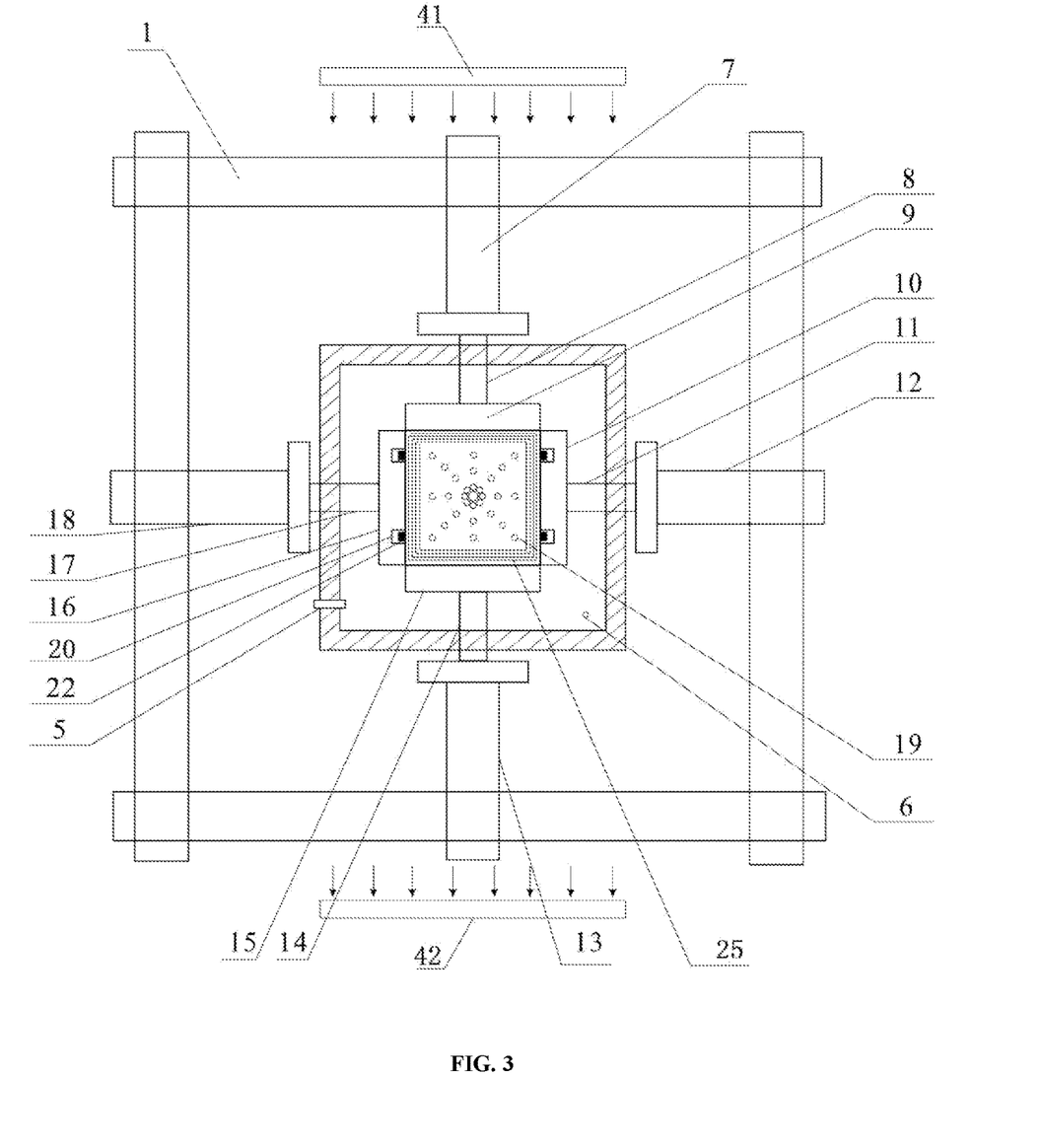
FIG. 3 is a top view of a device structure in accordance with the present disclosure.

The CT scanning module is composed of a CT transmission device 42 and a CT receiving device 43 located on the front side and the rear side of the true triaxial chamber, and has a function of dynamically scanning mesoscopic structure change of the rock specimen 2 in the hydraulic fracturing process. The CT transmission device 42 and the CT receiving device 43 are electrically connected to the computer 38, respectively.

Figure 2:
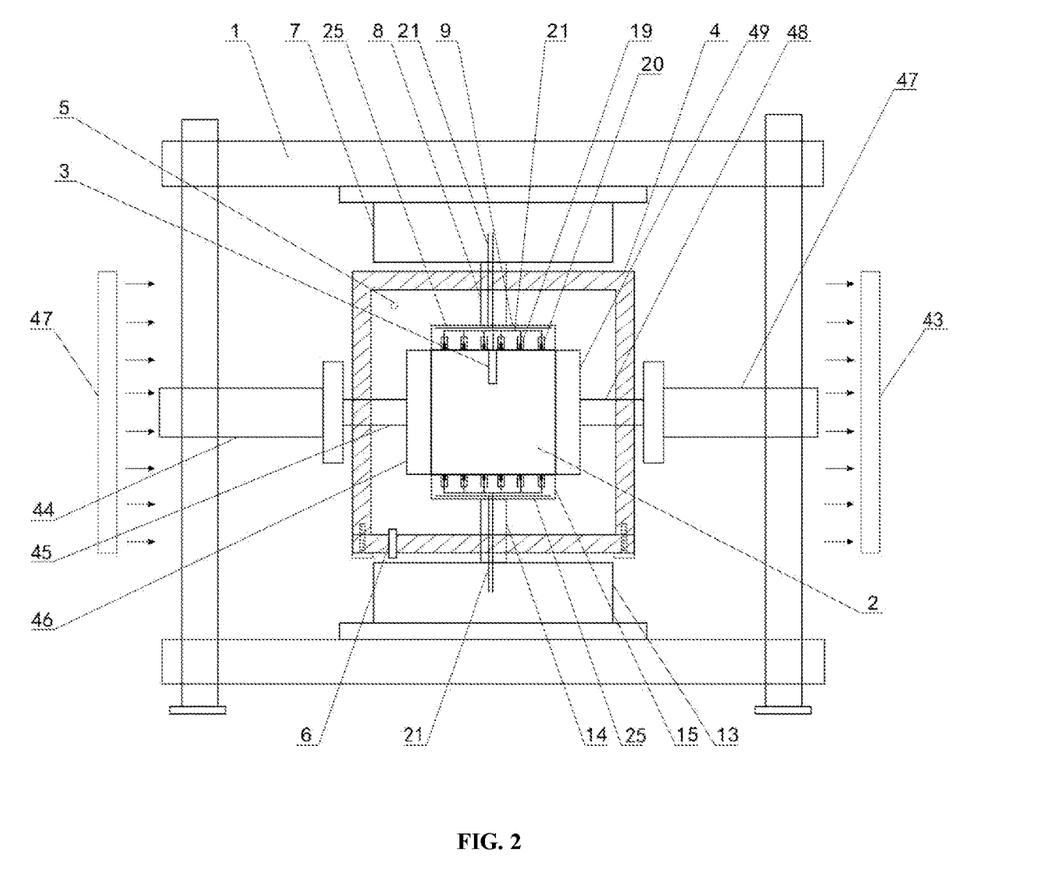
FIG. 2 is a left view of a device structure in accordance with the present disclosure.

The clamping and loading device includes an upper pressure supply chamber 7, an upper pressure column 8, an upper pressure plate 9, a lower pressure supply chamber 13, a lower pressure column 14, a lower pressure plate 15, a left side pressure supply chamber 16, a left pressure column 17, a left pressure plate 18, a right side pressure supply chamber 10, a right pressure column 11, a right pressure plate 12, a front pressure supply chamber 44, a front pressure column 45, a front pressure plate 46, a rear pressure supply chamber 47, a rear pressure column 48, and a rear pressure plate 49. The upper pressure supply chamber 7 and the lower pressure chamber 13 are respectively welded to the center positions of the inner sides of the top plate and the bottom plate. The upper pressure column, the lower pressure column, the left pressure column, the right pressure column, the front pressure column and the rear pressure column are respectively connected to the upper pressure supply chamber, the lower pressure supply chamber, the left side pressure supply chamber, the right side pressure supply chamber, the front pressure supply chamber and the rear pressure supply chamber. The upper pressure plate, the lower pressure plate, the left pressure plate, the right pressure plate, the front pressure plate and the rear pressure plate are connected to the front parts of the upper pressure column, the lower pressure column, the left pressure column, the right pressure column, the front pressure column and the rear pressure column. The pressure plates in all directions are configured to commonly press the rock specimen 2, thus providing the rock specimen with axial pressure and lateral pressure for the required experimental conditions. There is no any detection sensor in the front pressure plate 46 and the rear pressure plate 49.

A round hole is formed in the upper pressure plate 9 to provide an inlet for the water supply device. The electrical testing module, the strain testing module and the magnetic testing module are fixed to each of the upper pressure plate, the lower pressure plate, the left pressure plate and the right pressure plate. The acoustic emission modules are fixed to the left pressure plate and the right pressure plate.

The water supply device is formed by connecting an air compressor 29, a high-pressure air pipe 28, an airtight water trough 27, a high-pressure water supply pipe 26, and a fracturing pipe 3 in sequence. The fracturing pipe 3 is located in a fracturing hole on the end face of the rock specimen 2. The high-pressure water supply pipe 26 enters the airtight chamber 4 from the upper pressure supply chamber 7 via the upper pressure column 8, and then enters the fracturing pipe 3 from the hole on the upper pressure plate 9 to provide high-pressure water for the rock specimen 2.

The oil supply device includes an oil tank 30, an oil inlet pipeline 31 and an oil outlet pipeline 32. The oil inlet pipeline 31 is connected to the oil tank 30, and the oil inlet pipeline 31 is connected to the oil inlet 5. The oil outlet pipeline 32 is connected to the oil outlet 6, and the oil outlet pipeline 32 is connected to the oil tank 30. The oil tank 30 is configured for the oil supply and oil storage of the true triaxial chamber, thus controlling the operation of the device.

Figure 4:
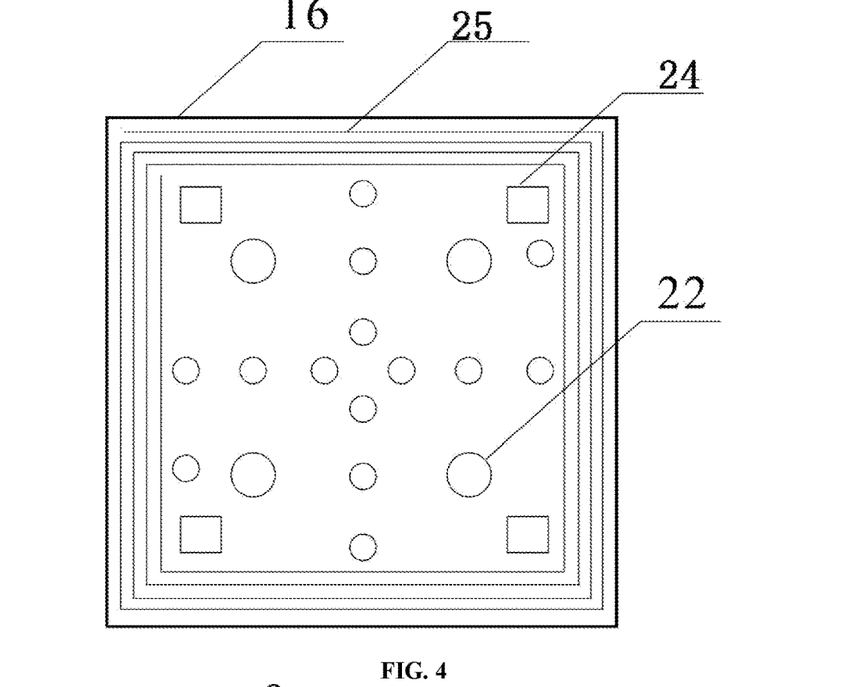
FIG. 4 is a schematic diagram of the sensor distribution on a left pressure plate and a right pressure plate in accordance with the present disclosure.
Figure 5:
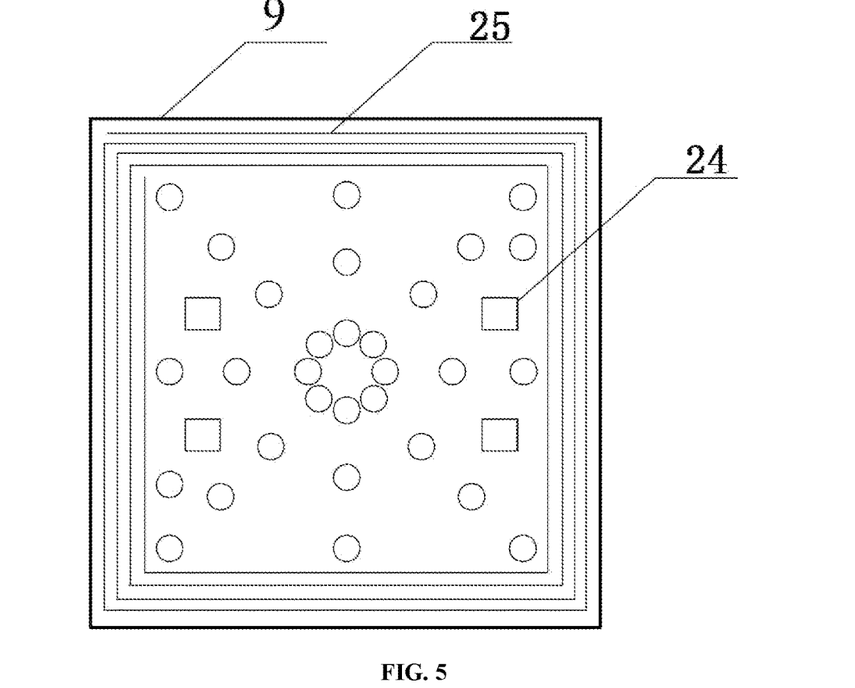
FIG. 5 is a schematic diagram of the sensor distribution on an upper pressure plate and a lower pressure plate in accordance with the present disclosure.

The electrical testing module includes copper rod electrodes 19, high-strength piezoelectric ceramic sheaths 20, a module black box 33 of a parallel electrical instrument, and a host 34 of the parallel electrical instrument. The copper rod electrodes 19 are respectively embedded into the upper pressure plate 9, the lower pressure plate 15, the left pressure plate 18 and the right pressure plate 12. The electrodes in the left pressure plate 18 and the right pressure plate 12 are in a "cross" shape, two orthogonal survey lines are provided with six equally spaced electrodes, and an electrode B and an electrode N are additionally provided. The electrodes in the upper pressure plate 9 and the lower pressure plate 15 are in a shape of the "Union Jack", a horizontal survey line and a vertical survey line each are provided with six equally spaced electrodes, two inclined survey lines each are provided with eight equally spaced electrodes, and an electrode B and an electrode N are additionally provided. The high-strength piezoelectric ceramic sheaths 20 are sleeved outside the copper rod electrodes 19, the copper rod electrodes 19 are electrically connected to the host 34 of the parallel electrical instrument by wires 21. The wires 21 are led out from the pressure plates via the pressure columns and the pressure chambers, and all outlets are sealed with sealing rings. The host 34 of the parallel electrical instrument is electrically connected to the computer 38. A passive testing mode and an active testing mode may be employed, where the passive testing refers to natural potential (q) acquisition, and the active testing refers to a method of supplying power to the electrode. Acquired parameters include electrical signals such as resistivity ($\rho$), current (I), and potential (U).

The acoustic emission testing module includes acoustic emission probes 22, high-strength piezoelectric ceramic sheaths 20, and an acoustic emission instrument 35. The acoustic emission probes 22 are embedded into the left pressure plate 18 and the right pressure plate 12, and four acoustic emission probes 22 are rectangularly distributed on each pressure plate. The high-strength piezoelectric ceramic sheaths 20 are sleeved outside the acoustic emission probes 22, the acoustic emission probes 22 are electrically connected to the acoustic emission instrument 35 by transmission lines 23. The transmission lines 23 are led out from the pressure plates via the pressure columns and the pressure chambers, and all outlets are sealed with sealing rings. The acoustic emission instrument 35 is electrically connected to the computer 28. Acquired parameters are acoustic emission signals such as frequency (f), and amplitude (D).

The strain testing module includes strain units 24, and a strain gauge 36. The strain units 24 are embedded into the upper pressure plate 9, the lower pressure plate 15, the left pressure plate 18 and the right pressure plate 12. Each pressure plate includes four strain units 24, and the strain units 24 are electrically connected to the strain gauge 36 by wires 21. The wires 21 are led out from the pressure plates via the pressure columns and the pressure chambers, and all outlets are sealed with sealing rings. The strain gauge 36 is electrically connected to the computer 38. An acquired parameter is a strain value ($\varepsilon$).

The magnetic testing module is formed by connecting multi-turn magnetic coil 25, wires 21, and a magnetic susceptibility meter 37. The multi-turn magnetic coil 25 is located in the upper pressure plate 9, the lower pressure plate 15, the left pressure plate 18 and the right pressure plate 12, the coil is made of metallic copper, and the number of coil turns in each pressure plate is $n\in[10,30]$. The multi-turn magnetic coil 25 is electrically connected to the magnetic susceptibility meter 37 by the wires 21. The wires 21 are led out from the pressure plates via the pressure columns and the pressure chambers, and all outlets are sealed with sealing rings. The magnetic susceptibility meter 37 is electrically connected to the computer 38.

All wires 21, transmission lines 23, sensors and accessories in the true triaxial chamber should meet pressure withstand requirements, and the pressure withstand values should be greater than 80 MPa.

Signals of four fields can be collected at a high frequency, the frequency of which is 3 MHz. Meanwhile, the computer 38 is configured for high-speed storage. In this way, the evolution characteristics of the signals in multiple fields at the moment that the rock specimen 2 fractures can be recorded.

The present disclosure further provides a multi-scale and multi-parameter collaborative testing method for true triaxial hydraulic fracturing, which is applied to the above multi-scale and multi-parameter collaborative testing device for true triaxial hydraulic fracturing, and includes the following steps:

- step 1: processing a retrieved rock sample, cutting the rock sample into a square block with a side length of 100 mm, then forming a fracturing port ($\varphi$=10 mm, d=20 mm) on the top face of a rock specimen 2, placing a fracturing pipe 3 in the hole, and connecting the fracturing pipe 3 to a high-pressure water supply pipe;
- step 2: installing and connecting sensors on pressure plates, connecting wires 21, turning on testing devices, keeping the sensors in good contact with the rock specimen 2 and work normally;
- step 3: sealing an airtight chamber 4, filling oil into the airtight chamber 4 until the airtight chamber 4 is full of oil; providing, by an oil supply device, a uniform confining pressure based on the rock specimen 2, and keeping the room temperature constant;
- step 4: turning on a water supply device, starting hydraulic fracturing, and turning on a CT scanning module, an acoustic emission testing module, a strain testing module and a magnetic testing module at the same time for real-time high-frequency testing and high-speed storage; and
- step 5: stopping hydraulic fracturing after complete fracture of the specimen, returning oil to an oil tank 30, opening the airtight chamber 4 to take out the specimen for observation and photographing, and performing data processing and analysis at the same time.

The data processing and analysis is specifically as follows.

1. Comparative analysis of multi-scale synchronous testing results: The multi-scale synchronous testing of the present disclosure is mainly embodied in mesoscopic scale and specimen scale. The three-dimensional crack distribution of the rock specimen 2 in the mesoscopic scale can be obtained based on the real-time scanning of the CT scanning device. The development and propagation of cracks in the rock specimen 2 in the specimen scale can be obtained based on multi-field testing of the probes on the pressure plates. The mesoscopic scale and the specimen scale are combined to provide a certain assistance for the obtaining of the fracture mechanism of hydraulic fracturing of the rock specimen 2.

2. Comparative analysis of four field testing results: The electrical parameters, acoustic emission parameters, strain parameters and magnetic parameters of the rock specimen 2 in the fracturing process can be obtained through the present disclosure, and the response process of hydraulic fracturing parameters of the rock specimen 2 can be depicted from four different field parameters. With the time variable as the common variable, the joint response characteristic curves of four parameters can be obtained by Origin software. Different parameters have different response characteristics in different stages of hydraulic fracturing of the rock specimen 2. By constructing a multi-parameter evaluation system, the response characteristics of field parameters of hydraulic fracturing of the rock specimen 2 at each stage can be sensitively captured.

3. Comparative analysis of response characteristics among parameters: When four field parameters are obtained, the field parameters have a certain correlation, and the correlation degree among the field parameters can be further known through the correlation analysis among the parameters constructed by SPASS. Correlation analysis methods include neural network, regression analysis, variance analysis, joint analysis, etc. The joint response mechanism among parameters can be further understood by constructing the correlation analysis among parameters.

4. Prediction analysis: Through the multi-scale and multi-parameter collaborative testing for the true triaxial hydraulic fracturing process, the device provided by the present disclosure is helpful to obtaining parameter response characteristics and fracture precursor information in real time. On the basis of multi-scale and multi-parameter, and the generation and propagation of cracks in the rock specimen 2 can be mathematically modeled and predicted according to massive monitoring data, which plays an important role in predicting the occurrence of fracture.

5. Construction of dynamically deformed and damaged digital cores: The three-dimensional distribution of a crack field can be obtained by real-time CT scanning of the hydraulic fracturing process, and the three-dimensional distribution of electrical parameters of the rock specimen 2 can be obtained by electrical testing. A three-dimensional digital core can be constructed according to scanning or parameter testing results. The construction of three-dimensional core can be the construction of a single parameter or the construction after data fusion. Through the construction of the digital core, the visualization degree of deformation and damage, crack initiation and propagation of the rock specimen 2 can be greatly improved.

In accordance with the multi-scale and multi-parameter collaborative testing device and method for true-triaxial hydraulic fracturing, the meso-scale and specimen-scale rock specimen fracture observation in the true triaxial hydraulic fracturing process is achieved. Four fields are provided for collaborative testing by the device, and thus the hydraulic fracturing process of the rock specimen is depicted from the perspectives of electrical parameters, acoustic generation parameters, strain parameters and magnetic parameters. Through the real-time monitoring of parameters, the initiation and propagation of cracks in the rock specimen can be captured, which is of a great significance to the obtaining of the mechanism of hydraulic fracturing of the deep rock specimen. The device has the functions of high-speed acquisition and high-speed storage, can capture the changes of the cracks and instantaneous parameters, and thus plays an important role in obtaining the fracture precursor information of the rock and predicting the crack propagation direction in the rock specimen. The device and method provided by the present disclosure can help to obtain the hydraulic fracturing principle of the deep rock mass, and can help to characterize the initiation and propagation parameters of the cracks under the action of the wall rock water pressure under mining conditions, the characteristics of hydraulic fracturing precursor information of the rock, and the prediction of cracks in the hydraulic fracturing process.

Several examples are used for illustration of the principles and implementation methods of the present disclosure. The description of the embodiments is merely used to help illustrate the method and its core principles of the present disclosure. In addition, those of ordinary skill in the art can make various modifications in terms of specific embodiments and scope of application in accordance with the teachings of the present disclosure. In conclusion, the content of this specification shall not be construed as a limitation to the present disclosure.

What is claimed is:

1. A multi-scale and multi-parameter collaborative testing device for true triaxial hydraulic fracturing, comprising a frame, a true triaxial chamber, a clamping and loading device, a water supply device, an oil supply device, a CT scanning module, an electrical testing module, an acoustic emission testing module, a strain testing module, a magnetic testing module, a computer, and a display screen; the clamping and loading device is fixed into the frame, the true triaxial chamber is placed in the clamping and loading device, and the clamping and loading device penetrates through the true triaxle chamber and then is connected to a rock specimen; the oil supply device is connected to the true triaxial chamber, and is configured to supply oil into the true triaxial chamber; the water supply device penetrates through the clamping and loading device and then is connected to the rock specimen, and is configured to provide high-pressure water for the rock specimen; the electrical testing module, the acoustic emission testing module, the strain testing module and the magnetic testing module are respectively fixed to the clamping and loading device and are connected to the rock specimen; the CT scanning module is located on the front side and the rear side of the true triaxial chamber; the CT scanning module, the electrical testing module, the acoustic emission testing module, the strain testing module and the magnetic testing module are connected to the computer; and the computer is electrically connected to the display screen.

2. The multi-scale and multi-parameter collaborative testing device for true triaxial hydraulic fracturing according to claim 1, wherein the true triaxial chamber comprises an airtight chamber, an oil inlet, and an oil outlet; the rock specimen is placed in the airtight chamber, and the airtight chamber is configured to provide a certain confining pressure for the rock specimen; the airtight chamber comprises a barrel body and a bottom plate, bolt holes are formed on the periphery of the lower end of the barrel body to link the barrel body to the bottom plate; the center of each face of the airtight chamber is provided with a round hole for the clamping and loading device to pass through; the oil inlet is formed in the upper part of the side face of the airtight chamber, the oil outlet is formed in the bottom face of the airtight chamber, and the oil inlet and the oil outlet respectively communicate with the internal of the airtight chamber;

the CT scanning module is comprised of a CT transmission device and a CT receiving device located on the front side and the rear side of the true triaxial chamber and is configured to provide real-time scanning for a specimen; and the CT transmission device and the CT receiving device are electrically connected to the computer, respectively.

3. The multi-scale and multi-parameter collaborative testing device for true triaxial hydraulic fracturing according to claim 1, wherein the frame is composed of a top plate, a bottom plate, and four columns; the clamping and loading device is welded to the center positions of the inner sides of the top plate and the bottom plate; the top plate and the bottom plate are connected by the columns and fixed by bolts, and anti-skid pads are fixed to the bottoms of the columns.

4. The multi-scale and multi-parameter collaborative testing device for true triaxial hydraulic fracturing according to claim 3, wherein the clamping and loading device comprises an upper pressure supply chamber, an upper pressure column, an upper pressure plate, a lower pressure supply chamber, a lower pressure column, a lower pressure plate, a left side pressure supply chamber, a left pressure column, a left pressure plate, a right side pressure supply chamber, a right pressure column, a right pressure plate, a front pressure supply chamber, a front pressure column, a front pressure plate, a rear pressure supply chamber, a rear pressure column, and a rear pressure plate; the upper pressure supply chamber and the lower pressure chamber are respectively welded to the center positions of the inner sides of the top plate and the bottom plate; the upper pressure column, the lower pressure column, the left pressure column, the right pressure column, the front pressure column and the rear pressure column are respectively connected to the upper pressure supply chamber, the lower pressure supply chamber, the left side pressure supply chamber, the right side pressure supply chamber, the front pressure supply chamber and the rear pressure supply chamber; the upper pressure plate, the lower pressure plate, the left pressure plate, the right pressure plate, the front pressure plate and the rear pressure plate are connected to the front parts of the upper pressure column, the lower pressure column, the left pressure column, the right pressure column, the front pressure column and the rear pressure column; and the pressure plates in all directions are configured to commonly press the rock specimen, thus providing the rock specimen with axial pressure and lateral pressure for the required experimental conditions;

a round hole is formed in the upper pressure plate to provide an inlet for the water supply device; the electrical testing module, the strain testing module and the magnetic testing module are fixed to each of the upper pressure plate, the lower pressure plate, the left pressure plate and the right pressure plate; and the acoustic emission modules are fixed to the left pressure plate and the right pressure plate.

5. The multi-scale and multi-parameter collaborative testing device for true triaxial hydraulic fracturing according to claim 4, wherein the water supply device is formed by connecting an air compressor, a high-pressure gas pipe, an airtight water trough and a high-pressure water supply pipe in sequence; the fracturing pipe is located in a fracturing hole on the end face of the rock specimen, the high-pressure water supply pipe enters the airtight chamber from the upper pressure supply chamber via the upper pressure column, and then enters the fracturing pipe from the hole on the upper pressure plate to provide high-pressure water for the rock specimen;

the oil supply device comprises an oil tank, an oil inlet pipeline and an oil outlet pipeline; the oil inlet pipeline is connected to the oil tank, and the oil inlet pipeline is connected to the oil inlet; the oil outlet pipeline is connected to the oil outlet, and the oil outlet pipeline is connected to the oil tank and is configured to supply oil into the airtight chamber.

6. The multi-scale and multi-parameter collaborative testing device for true triaxial hydraulic fracturing according to claim 4, wherein the electrical testing module comprises copper rod electrodes, high-strength piezoelectric ceramic sheaths, a module black box of a parallel electrical instrument, and a host of the parallel electrical instrument; the copper rod electrodes are respectively embedded into the upper pressure plate, the lower pressure plate, the left pressure plate and the right pressure plate; the electrodes in the left pressure plate and the right pressure plate are in a "cross" shape, two orthogonal survey lines are provided with six equally spaced electrodes, and an electrode B and an electrode N are additionally provided; the electrodes in the upper pressure plate and the lower pressure plate are in a shape of the "Union Jack", a horizontal survey line and a vertical survey line each are provided with six equally spaced electrodes, two inclined survey lines each are provided with eight equally spaced electrodes, and an electrode B and an electrode N are additionally provided; the high-strength piezoelectric ceramic sheaths are sleeved outside the copper rod electrodes, the copper rod electrodes are connected to the module black box of the parallel electrical instrument, the module black box of the parallel electrical instrument is electrically connected to the host of the parallel electrical instrument, and the host of the parallel electrical instrument is electrically connected to the computer.

7. The multi-scale and multi-parameter collaborative testing device for true triaxial hydraulic fracturing according to claim 4, wherein the acoustic emission testing module comprises acoustic emission probes, high-strength piezoelectric ceramic sheaths, and an acoustic emission instrument; the acoustic emission probes are embedded into the left pressure plate and the right pressure plate, and four acoustic emission probes are rectangularly distributed on each pressure plate; the high-strength piezoelectric ceramic sheaths are sleeved outside the acoustic emission probes, the acoustic emission probes are electrically connected to the acoustic emission instrument, and the acoustic emission instrument is electrically connected to the computer.

8. The multi-scale and multi-parameter collaborative testing device for true triaxial hydraulic fracturing according to claim 4, wherein the strain testing module comprises strain units, and a strain gauge; the strain units are embedded into the upper pressure plate, the lower pressure plate, the left pressure plate and the right pressure plate; each pressure plate comprises four strain units, the strain units are electrically connected to the strain gauge, and the strain gauge is electrically connected to the computer;

the magnetic testing module comprises multi-turn magnetic coil, and a magnetic susceptibility meter; the multi-turn magnetic coil is located in the upper pressure plate, the lower pressure plate, the left pressure plate and the right pressure plate, the coil is made of metallic copper, and the number of coil turns in each pressure plate is $n \in [10,30]$; and the multi-turn magnetic coil is electrically connected to the magnetic susceptibility meter, and the magnetic susceptibility meter is electrically connected to the computer.

9. A multi-scale and multi-parameter collaborative testing method for true triaxial hydraulic fracturing, which is applied to the multi-scale and multi-parameter collaborative testing device for true triaxial hydraulic fracturing according to claim 1, and comprises the following steps:

step 1: processing a retrieved rock sample, cutting the rock sample into a square block with a side length of 100 mm, forming a fracturing port with a diameter of 10 mm and a depth of 20 mm on the top face of a rock specimen, placing a fracturing pipe in the hole, and connecting the fracturing pipe to a high-pressure water supply pipe;

step 2: installing and connecting sensors on pressure plates, connecting wires, and turning on testing devices;

step 3: sealing an airtight chamber, filling oil into the airtight chamber until the airtight chamber is full of oil, and keeping the room temperature constant;

step 4: turning on a water supply device, starting hydraulic fracturing, and turning on a CT scanning module, an acoustic emission testing module, a strain testing module and a magnetic testing module at the same time; and step 5: stopping hydraulic fracturing after complete fracture of the specimen, returning oil to an oil tank, opening the airtight chamber to take out the specimen for observation and photographing, and performing data processing and analysis at the same time.

10. The method according to claim 9, wherein the true triaxial chamber comprises an airtight chamber, an oil inlet, and an oil outlet; the rock specimen is placed in the airtight chamber, and the airtight chamber is configured to provide a certain confining pressure for the rock specimen; the airtight chamber comprises a barrel body and a bottom plate, bolt holes are formed on the periphery of the lower end of the barrel body to link the barrel body to the bottom plate; the center of each face of the airtight chamber is provided with a round hole for the clamping and loading device to pass through; the oil inlet is formed in the upper part of the side face of the airtight chamber, the oil outlet is formed in the bottom face of the airtight chamber, and the oil inlet and the oil outlet respectively communicate with the internal of the airtight chamber;

the CT scanning module is comprised of a CT transmission device and a CT receiving device located on the front side and the rear side of the true triaxial chamber and is configured to provide real-time scanning for a specimen; and the CT transmission device and the CT receiving device are electrically connected to the computer, respectively.

11. The method according to claim 9, wherein the frame is composed of a top plate, a bottom plate, and four columns; the clamping and loading device is welded to the center positions of the inner sides of the top plate and the bottom plate; the top plate and the bottom plate are connected by the columns and fixed by bolts, and anti-skid pads are fixed to the bottoms of the columns.

12. The method according to claim 11, wherein the clamping and loading device comprises an upper pressure supply chamber, an upper pressure column, an upper pressure plate, a lower pressure supply chamber, a lower pressure column, a lower pressure plate, a left side pressure supply chamber, a left pressure column, a left pressure plate, a right side pressure supply chamber, a right pressure column, a right pressure plate, a front pressure supply chamber, a front pressure column, a front pressure plate, a rear pressure supply chamber, a rear pressure column, and a rear pressure plate; the upper pressure supply chamber and the lower pressure chamber are respectively welded to the center positions of the inner sides of the top plate and the bottom plate; the upper pressure column, the lower pressure column, the left pressure column, the right pressure column, the front pressure column and the rear pressure column are respectively connected to the upper pressure supply chamber, the lower pressure supply chamber, the left side pressure supply chamber, the right side pressure supply chamber, the front pressure supply chamber and the rear pressure supply chamber; the upper pressure plate, the lower pressure plate, the left pressure plate, the right pressure plate, the front pressure plate and the rear pressure plate are connected to the front parts of the upper pressure column, the lower pressure column, the left pressure column, the right pressure column, the front pressure column and the rear pressure column; and the pressure plates in all directions are configured to commonly press the rock specimen, thus providing the rock specimen with axial pressure and lateral pressure for the required experimental conditions;

a round hole is formed in the upper pressure plate to provide an inlet for the water supply device; the electrical testing module, the strain testing module and the magnetic testing module are fixed to each of the upper pressure plate, the lower pressure plate, the left pressure plate and the right pressure plate; and the acoustic emission modules are fixed to the left pressure plate and the right pressure plate.

13. The method according to claim 12, wherein the water supply device is formed by connecting an air compressor, a high-pressure gas pipe, an airtight water trough and a high-pressure water supply pipe in sequence; the fracturing pipe is located in a fracturing hole on the end face of the rock specimen, the high-pressure water supply pipe enters the airtight chamber from the upper pressure supply chamber via the upper pressure column, and then enters the fracturing pipe from the hole on the upper pressure plate to provide high-pressure water for the rock specimen;

the oil supply device comprises an oil tank, an oil inlet pipeline and an oil outlet pipeline; the oil inlet pipeline is connected to the oil tank, and the oil inlet pipeline is connected to the oil inlet; the oil outlet pipeline is connected to the oil outlet, and the oil outlet pipeline is connected to the oil tank and is configured to supply oil into the airtight chamber.

14. The method according to claim 12, wherein the electrical testing module comprises copper rod electrodes, high-strength piezoelectric ceramic sheaths, a module black box of a parallel electrical instrument, and a host of the parallel electrical instrument; the copper rod electrodes are respectively embedded into the upper pressure plate, the lower pressure plate, the left pressure plate and the right pressure plate; the electrodes in the left pressure plate and the right pressure plate are in a "cross" shape, two orthogonal survey lines are provided with six equally spaced electrodes, and an electrode B and an electrode N are additionally provided; the electrodes in the upper pressure plate and the lower pressure plate are in a shape of the "Union Jack", a horizontal survey line and a vertical survey line each are provided with six equally spaced electrodes, two inclined survey lines each are provided with eight equally spaced electrodes, and an electrode B and an electrode N are additionally provided; the high-strength piezoelectric ceramic sheaths are sleeved outside the copper rod electrodes, the copper rod electrodes are connected to the module black box of the parallel electrical instrument, the module black box of the parallel electrical instrument is electrically connected to the host of the parallel electrical instrument, and the host of the parallel electrical instrument is electrically connected to the computer.

15. The method according to claim 12, wherein the acoustic emission testing module comprises acoustic emission probes, high-strength piezoelectric ceramic sheaths, and an acoustic emission instrument; the acoustic emission probes are embedded into the left pressure plate and the right pressure plate, and four acoustic emission probes are rectangularly distributed on each pressure plate; the high-strength piezoelectric ceramic sheaths are sleeved outside the acoustic emission probes, the acoustic emission probes are electrically connected to the acoustic emission instrument, and the acoustic emission instrument is electrically connected to the computer.

16. The method according to claim 12, wherein the strain testing module comprises strain units, and a strain gauge; the strain units are embedded into the upper pressure plate, the lower pressure plate, the left pressure plate and the right pressure plate; each pressure plate comprises four strain units, the strain units are electrically connected to the strain gauge, and the strain gauge is electrically connected to the computer;

the magnetic testing module comprises multi-turn magnetic coil, and a magnetic susceptibility meter; the multi-turn magnetic coil is located in the upper pressure plate, the lower pressure plate, the left pressure plate and the right pressure plate, the coil is made of metallic copper, and the number of coil turns in each pressure plate is $n \in [10,30]$; and the multi-turn magnetic coil is electrically connected to the magnetic susceptibility meter, and the magnetic susceptibility meter is electrically connected to the computer.

\* \* \* \* \*